(12) United States Patent
Shakespeare et al.

(10) Patent No.: US 9,002,372 B2
(45) Date of Patent: Apr. 7, 2015

(54) LOCATING SYSTEM FOR AUTISTIC CHILD AND OTHERS

(71) Applicant: Danielle's Buddy, Inc., Allentown, PA (US)

(72) Inventors: Walter Jeffrey Shakespeare, Macungie, PA (US); Clarence William Crompton, Macungie, PA (US); Lawrence P. Levitt, Allentown, PA (US); Sharone Vaknin, Allentown, PA (US); Phillip William Wallace, Bernardsville, NJ (US)

(73) Assignee: Danielle's Buddy, Inc., Allentown, PA (US)

( * ) Notice: Subject to any disclaimer, the term of this patent is extended or adjusted under 35 U.S.C. 154(b) by 0 days.

(21) Appl. No.: 13/658,217

(22) Filed: Oct. 23, 2012

(65) Prior Publication Data

US 2013/0260785 A1     Oct. 3, 2013

Related U.S. Application Data

(60) Provisional application No. 61/686,067, filed on Mar. 30, 2012.

(51) Int. Cl.
*H04M 11/04*     (2006.01)
*H04M 3/42*     (2006.01)
(Continued)

(52) U.S. Cl.
CPC ............. *G01S 5/0027* (2013.01); *H04W 64/00* (2013.01); *G01S 19/14* (2013.01); *G01S 5/0263* (2013.01); *G01S 5/20* (2013.01)

(58) Field of Classification Search
CPC ................................ H04W 4/02; H04W 64/00
USPC ............. 455/404.2, 414.1–414.2, 456.1–457; 340/539.13, 539.14, 539.15, 539.32, 340/8.1
See application file for complete search history.

(56) References Cited

U.S. PATENT DOCUMENTS

| | | |
|---|---|---|
| 4,891,650 A | 1/1990 | Sheffer |
| 5,021,794 A | 6/1991 | Lawrence |

(Continued)

OTHER PUBLICATIONS http://www.brickhousesecurity.com/category/gps+tracking.do?nType=1.

(Continued)

*Primary Examiner* — Dung Hong
(74) *Attorney, Agent, or Firm* — Norris McLaughlin & Marcus

(57) ABSTRACT

Mentally challenged persons such as autistic children and Alzheimer's patients can become lost and they are hard to find because they have difficulty communicating or they are confused and disoriented. The present invention provides an apparatus, system and methods for locating lost persons (or animals or packages) whether they are indoors or outdoors. The apparatus comprises a cellular telephone unit which can be activated by a RF signal and which a child or patient can wear. The wearable unit can be activated by a caregiver's smart phone having a locating application installed therein. The locating application enables the caregiver to locate the lost person using radio direction finder triangulation when the lost person is within a few hundred feet of the caregiver. When the lost person is further away, the locating application employs cell phone tower triangulation or the wearable unit GPS/Assisted GPS application to determine an approximate location of the lost person. As the caregiver moves close enough to the approximate location, the radio direction finder triangulation is used to calculate a more exact location to find the lost person.

4 Claims, 3 Drawing Sheets

(51) Int. Cl.

| | |
|---|---|
| *H04W 24/00* | (2009.01) |
| *G08B 5/22* | (2006.01) |
| *G08B 1/08* | (2006.01) |
| *G01S 5/00* | (2006.01) |
| *H04W 64/00* | (2009.01) |
| *G01S 19/14* | (2010.01) |
| *G01S 5/02* | (2010.01) |
| *G01S 5/20* | (2006.01) |

(56) References Cited

U.S. PATENT DOCUMENTS

| | | | |
|---|---|---|---|
| 5,055,851 A | 10/1991 | Sheffer | |
| 5,119,072 A | 6/1992 | Hemingway | |
| 5,218,367 A | 6/1993 | Sheffer | |
| 5,289,163 A | 2/1994 | Perez et al. | |
| 5,307,763 A | 5/1994 | Arthur | |
| 5,485,163 A | 1/1996 | Singer et al. | |
| 5,572,204 A | 11/1996 | Timm et al. | |
| 5,583,914 A | 12/1996 | Chang et al. | |
| 5,617,074 A | 4/1997 | White | |
| 5,629,693 A | 5/1997 | Janky | |
| 5,731,757 A | 3/1998 | Layson, Jr. | |
| 5,742,233 A | 4/1998 | Hoffman et al. | |
| 5,838,237 A | 11/1998 | Revell et al. | |
| 6,066,161 A | 5/2000 | Parella | |
| 6,075,442 A | 6/2000 | Welch | |
| 6,084,517 A | 7/2000 | Rabanne et al. | |
| 6,118,380 A | 9/2000 | Gannon | |
| 6,243,039 B1 * | 6/2001 | Elliot | 342/457 |
| 6,246,376 B1 * | 6/2001 | Bork et al. | 343/760 |
| 6,304,186 B1 | 10/2001 | Rabanne et al. | |
| 6,396,403 B1 | 5/2002 | Haner | |
| 6,529,131 B2 | 3/2003 | Wentworth | |
| 6,809,644 B1 | 10/2004 | Titus | |
| 6,826,120 B1 | 11/2004 | Decker et al. | |
| 6,882,837 B2 | 4/2005 | Fernandez et al. | |
| 7,042,361 B2 | 5/2006 | Kazdin et al. | |
| 7,098,785 B2 | 8/2006 | Wong | |
| 7,259,671 B2 | 8/2007 | Ganley et al. | |
| 7,323,991 B1 | 1/2008 | Eckert | |
| 7,353,034 B2 | 4/2008 | Haney | |
| 7,385,513 B2 | 6/2008 | Everest | |
| 7,495,562 B2 | 2/2009 | Monroe | |
| 7,511,627 B2 * | 3/2009 | Holoyda | 340/573.4 |
| 7,551,076 B2 | 6/2009 | Tyroler | |
| 7,671,763 B1 | 3/2010 | Riffel | |
| 7,873,423 B2 | 1/2011 | Ishikawa | |
| 8,102,316 B1 | 1/2012 | Brucker | |
| 2002/0145559 A1 | 10/2002 | Sullivan | |
| 2003/0032436 A1 * | 2/2003 | Mikuni | 455/457 |
| 2004/0132461 A1 * | 7/2004 | Duncan | 455/456.1 |
| 2004/0198382 A1 | 10/2004 | Wong | |
| 2004/0224720 A1 | 11/2004 | Sun et al. | |
| 2005/0020274 A1 | 1/2005 | Ursini | |
| 2005/0264416 A1 | 12/2005 | Maurer | |
| 2006/0145853 A1 | 7/2006 | Richards | |
| 2006/0199534 A1 | 9/2006 | Smith | |
| 2006/0223518 A1 | 10/2006 | Haney | |
| 2007/0066323 A1 * | 3/2007 | Park et al. | 455/456.2 |
| 2007/0194911 A1 | 8/2007 | Page | |
| 2007/0266959 A1 | 11/2007 | Brooks | |
| 2007/0279237 A1 | 12/2007 | Julian et al. | |
| 2008/0051101 A1 | 2/2008 | Ha et al. | |
| 2008/0062120 A1 | 3/2008 | Wheeler et al. | |
| 2008/0064413 A1 | 3/2008 | Breed | |
| 2008/0311882 A1 | 12/2008 | Schlager | |
| 2009/0040041 A1 | 2/2009 | Janetis et al. | |
| 2009/0289844 A1 * | 11/2009 | Palsgrove et al. | 342/357.07 |
| 2009/0318189 A1 | 12/2009 | Ben-David | |
| 2010/0145987 A1 | 6/2010 | Harper | |
| 2010/0207781 A1 | 8/2010 | Shuster | |
| 2010/0248681 A1 | 9/2010 | Phills | |
| 2010/0262367 A1 | 10/2010 | Riggins | |
| 2010/0267361 A1 | 10/2010 | Sullivan | |
| 2010/0309002 A1 | 12/2010 | Duvall | |
| 2010/0321196 A1 * | 12/2010 | Cheng | 340/686.6 |
| 2011/0076949 A1 | 3/2011 | Smith | |
| 2011/0077025 A1 | 3/2011 | Kudo | |
| 2011/0177832 A1 | 7/2011 | Huang | |
| 2011/0183618 A1 | 7/2011 | Behzad | |
| 2011/0187527 A1 * | 8/2011 | Goodwill et al. | 340/539.13 |
| 2011/0207441 A1 | 8/2011 | Wood | |
| 2011/0210847 A1 * | 9/2011 | Howard et al. | 340/539.32 |
| 2011/0228727 A1 | 9/2011 | Julo et al. | |
| 2011/0257923 A1 | 10/2011 | Boulton | |
| 2011/0279323 A1 | 11/2011 | Hung | |
| 2012/0009943 A1 * | 1/2012 | Greenberg | 455/456.1 |
| 2012/0023171 A1 | 1/2012 | Redmond | |
| 2012/0220289 A1 * | 8/2012 | Bellmare | 455/423 |
| 2012/0322380 A1 * | 12/2012 | Nannarone et al. | 455/41.2 |
| 2013/0010018 A1 | 1/2013 | Economy | |

OTHER PUBLICATIONS http://www.nationwidemedical.com.
www.verizonwireless.com
http://www.mommyimhere.com.
http://www.emfinders.com
http://etrak.com/company/our-mission.

* cited by examiner

LOCATING SYSTEM FOR AUTISTIC CHILD AND OTHERS

CROSS-REFERENCE TO RELATED APPLICATION

This application claims priority of provisional application Ser. No. 61/686,067, filed Mar. 30, 2012 and entitled "Locating System For Autistic Child".

FIELD OF THE INVENTION

The invention has to do with an apparatus, system and method for locating a person who may be lost or an animal, such as a lost pet, or a lost package. More particularly, the invention can be used to locate an autistic child or an Alzheimer's patient or another person having a cognitive disorder that may cause them to become lost.

BACKGROUND OF THE INVENTION

Parents and caregivers of children on the autism spectrum have a very challenging responsibility that can often consume a family. These children require constant care and monitoring; they have difficulty communicating, and can easily become lost if the caregiver's attention is only momentarily distracted. Focus groups of parents of autistic children report that they have almost universally experienced the terror and frustration of losing a child in a crowded street, theater, or mall. Since the child often cannot communicate well, they are very difficult to locate, even when there is a public address system or other means of alerting the crowd to their plight.

With the advent of sophisticated global positioning satellite ("GPS") technology and smart phones there is no shortage of locating technologies for children, pets, packages, house arrest prisoners, and adults, each with some special features for that particular group. The technologies fall into several major categories as follows:

Child GPS locator by Brickhouse transmits the GPS coordinates to a smart phone and plots the position on a map. This device also can track the movements of an individual over time. It only works where there is access to satellite signals, i.e. outdoors. The device is available from Brickhouse Security, 980 Avenue of the Americas, 3rd Floor, New York, N.Y. 10018, http://www.brickhousesecurity.com/category/gps+tracking.do?nType=1

Wireless locator devices use a specialized radio direction finder receiver to locate the wearable device within a few hundred feet. Such devices are available from Nationwide Medical Incorporated, 28632 Roadside Drive, Suite 210, Agoura Hills, Calif. 91301, http://www.nationwidemedical.com.

Cell phone locators allow the proximity to the cell towers to triangulate a rough position to the wearable or carried cell phone. This type of device is available from Verizon Wireless, www.verizonwireless.com.

"Mommy I'm Here" sound signal incorporates a small transmitter that activates an audible signal allowing the caregiver to locate the wearer as long as they are within earshot. This device is available from Mommy I'm Here, 4135 Blackhawk Plaza Circle, Suite 280, Danville, Calif. 94506 http://www.mommyimhere.com.

Special police band emergency service uses a special police band ultra high frequency ("UHF") radio signal on the wearable device to allow a radio direction finder used by the authorities to find the lost person. The office of emergency personnel must be called and an official search implemented. These devices are available from EmFinders, http://www.emfinders.com.

eTrak is a device that sends a set of geographical (latitude and longitude) coordinates when a child leaves a particular area or safety zone. The product is available from: eTrak Corporation, 8235 Douglas Ave. Suite #910, Dallas, Tex. 75225, infoetrak.com.

Each of these technologies has advantages and disadvantages. In most cases the technologies available are in a sense looking for a problem to solve, rather than being an engineered solution to a specific problem such as a lost autistic child or Alzheimer's patient. As a result, few parents of autistic children have or use these products despite the near constant fear of losing their child in a crowd. Focus groups have reported the reasons for this and they include cost, both up front and monthly, size, battery life, and ability to locate the child indoors as well as outdoors. There also appear to be several physical versions needed depending on where in the spectrum each child is, as well as the age and gender of the child, although many of the autistic children are male.

Examples of the art in each of the respective technological areas are as follows:

U.S. Pat. No. 5,485,163 to Singer et al. describes the use of a cellular network to locate a person by sending the coordinates of the receiving node to an authorized user. It does not describe the use of a GPS signal.

U.S. Pat. No. 5,583,914 to Change et al. teaches a method for optimizing a transmission signal path utilizing GPS locating technology.

U.S. Pat. No. 5,572,204 to Timm et al. discloses a method for providing roadside assistance to a stranded vehicle utilizing a GPS locating signal.

U.S. Pat. No. 5,021,794 to Lawrence provides a method of using an UHF homing signal on a wearable device to allow authorities to track and find a lost individual.

U.S. Pat. No. 5,731,757 to Layson, et al. describes a body worn device to track convicts on house arrest and uses both GPS and a wireless link with a base station to keep track of an individual.

U.S. Pat. No. 5,742,233 to Hoffman, et al. describes a wearable device which when activated by the user transmits a distress signal as well as the GPS location of the individual.

U.S. Pat. No. 6,075,442 to Welch discloses a wearable device used to generate a radio frequency ("RF") signal that can be located in both distance and direction by a specialized radio direction finding receiver carried by the caregiver to find the individual assumed to be nearby.

U.S. Pat. No. 7,511,627 to Holoyda describes a locating device with the addition of a series of distance thresholds with alarms if the wearer goes beyond a certain boundary area. It also utilizes a radio direction finding receiver carried by the caregiver to vector in on the location of the wearable device.

Before applicants' presently described invention, the available technology had numerous limitations in respect of the quality of the information generated to assist in locating a lost person and/or in the need to use physically cumbersome equipment. For example, it has been possible to get a rough location of a lost child or adult using cellular triangulation technology from the cell sites but this is nowhere near accurate enough to find a child lost in a crowd within a few hundred feet of the caregiver. Alternatively, a radio frequency signal from a wearable device was used to determine the distance and direction to the lost person using a specialized radio direction finding receiver that had to be carried by the caregiver. GPS technology can be accurate enough to put the location of a lost person on a map and guide the finder to them.

But this technology must have access to the satellites in order to function and, therefore, is not reliable indoors or in a city with tall buildings.

The present invention overcomes the deficiencies of the previously known systems by providing apparatus comprising a two tier system utilizing cell phone tower triangulation technology for gross or approximate location, which works both indoors and outdoors anywhere there is cell service, and/or using GPS technology outdoors, combined with a radio direction finding technology to guide the finder to the lost person within a few hundred feet. In the preferred embodiment, the radio direction finder receiver is implemented in a smart phone so that the caregiver will always have the receiver at hand and be able to locate a lost person or pet. A cellular telephone unit is adapted to be affixed to or worn by a person, animal or package that may become lost. For example, the cellular telephone unit may be incorporated in a bracelet which cannot be removed by the person or it may be surgically implanted below the skin of the person or animal. This unit and its associated components are referred to from time to time herein as the "wearable unit".

The term "package" as used herein is intended to mean any kind of item that can be lost; for example, a parcel, a vehicle, a device or any other physical thing.

SUMMARY OF THE INVENTION

The apparatus, system and methods of the present invention rely on a variety of RF technologies in combination with others (e.g., GPS cellular triangulation) to locate a lost child. The invention is focused on technologies which are included in the vast majority of current smart phones, or are easily interfaced with smart phones. For example, the invention can employ a smart phone as a radio direction finder for lost persons, animals or packages within a few hundred feet of the user both indoors and outdoors. The methods are effective indoors such as in shopping malls, theaters and the like as well as outdoors such as in crowded streets, parks, beaches and anywhere else where cellular telephone service is available.

The invention can comprise two modes of activation once a person, animal or package is lost. With the first, the system is manually activated by the user of the smart phone and, for example, uses either paging (as found in a pager typically used by firemen and physicians), or SMS paging. (SMS is a part of cellular telephony systems that allow the exchange of short text messages between devices using standardized communications protocols.) The second is automatic detection, which relies on a RF wireless connection between the wearable unit, and the smart phone. A unique RF link between the wearable unit and the smart phone is established (similar to a Bluetooth headset connection) and when the link is broken (for example when the wearer of the wearable unit leaves the specified range, or enters a closed elevator) the user of the smart phone is alerted, and the search routine is automatically started both on the phone and in the wearable unit. (The term "Bluetooth" is used herein to mean a proprietary open wireless technology standard for exchanging data over short distances using short wavelength RF transmissions in the band from 2400-2480 MHz.)

Each mode presents a different hardware and software structure, cost of acquisition and operation, and offers unique capabilities. The invention incorporates manual mode, or automatic mode, or a combination of both modes in order to provide maximum search coverage and capability.

The preferred embodiment of the invention embodies a two tiered method of cell phone triangulation and/or GPS/Assisted GPS locating technology for gross or approximate location, and a smart phone radio direction finder application for more precise location within a few hundred feet of the lost person. (Assisted GPS uses network resources to locate and use global positioning satellites in poor signal conditions.) The apparatus and system provide a seamless locating technology which shows a distant lost person's approximate location on a smart phone map as well as the distance and compass direction to a nearby lost person on the smart phone screen. The apparatus, system and methods can be used to locate lost persons over the full cellular telephone range and there is no need for police or emergency notification.

DESCRIPTION OF THE PREFERRED EMBODIMENTS

Figure 1:
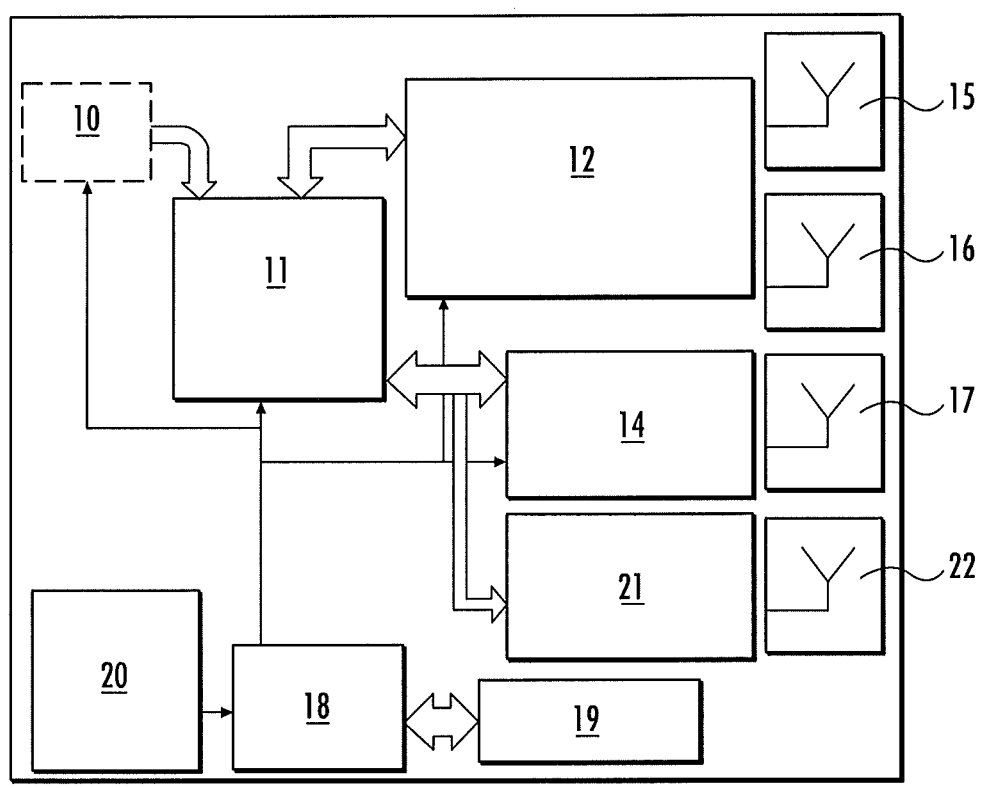
FIG. 1 is a functional block diagram of the wearable unit.

The present invention can be used to locate lost persons, animals, packages and the like. It is described below primarily in respect of its application for finding autistic children but it is to be understood that there are many other applications for finding lost persons, animals or packages.

The system and methods of the present invention require apparatus comprising a cellular telephone unit which can be activated by an activating RF signal such as a paging signal, SMS paging, a text message, etc. as is well known to those having skill in the art. For example, the cellular telephone unit can have SMS paging capability or it can be combined with a pager chip or the like. The term "cellular telephone unit" as used herein includes a cellular telephone module, preferably having GPS/Assisted GPS capability, and one or more other modules such as a WiFi module, Bluetooth module and/or the like. As noted above, the invention can optionally embody an automatic detection feature which relies on a RF wireless connection between the wearable unit and the smart phone.

In the embodiment employing the manual activation mode, the wearable unit has RF receivers capable of decoding pager signals including those used in commercial paging systems, such as FLEX, POCSAG and ERMES, or SMS paging signals. Using paging technology, a receiver in the wearable unit decodes paging signals at low power consumption until it detects the signal uniquely intended for that receiver. The manual mode allows the user of the smart phone to activate the main electronics of the wearable unit (GPS, WiFi (wireless local area network), audio annunciator, etc.) as long as the wearable unit is in reception range of the cellular network or paging system employed.

The automatic activation mode uses Wireless Personal Area Network (WPAN) technology. Currently the Institute of Electrical and Electronics Engineers (IEEE) provide standards for a variety of WPAN network technologies. The most likely standard to be used in the wearable unit is IEEE 802.15.1 or a similar standard. The invention is not tied to any particular standard and it is understood that other standards may be adopted which would be suitable for use with the invention. Some examples of other standards are: IEEE 802.15.3 (high data rate, including "Bluetooth") or IEEE 802.15.4 (low data rate, including "ZigBee" and others) but there are many other possibilities that are currently available or that may be developed in the future. ("ZigBee" is a specification for a suite of high level communication protocols using small, low-power digital radios based on an IEEE 802 standard for wireless personal area networks.) Currently only the high data rate version "Bluetooth" is commonly found on cellular telephones (smart or ordinary), but an embodiment that uses the low data rate standard would be a preferable embodiment when and if these become commonly implemented on smart phones.

By using technology that is available on smart phones, the invention relieves the user (caregiver) from carrying additional tools and antennae, or permanently or temporarily attaching such tools to their phones, improving user experience, and increasing the number of likely users. The smart phone will be capable of transmitting an activating RF signal (e.g., an SMS paging signal) to activate the cellular telephone unit and will have a visual display screen, a compass and an accelerometer.

In general, the preferred embodiment of the invention operates by establishing communication between the caregiver's smart phone and the wearable unit. The wearable unit will communicate with the smart phone approximately once per minute to keep the connection (mode 1). If the wearable unit strays out of range, an alarm will trigger on the smart phone, the application will immediately go into direction finding mode. The wearable unit will be activated, and will begin identifying its location and sending its location to the smart phone via SMS messaging. In the meantime, or if a GPS lock is not established, a WiFi, Bluetooth or other cellular telephone unit RF signal transmitter will go to full power and continuously attempt to lock to the smart phone (providing the "beacon" for the direction finder). The smart phone can also trigger the lost child signal via SMS messaging and activate the wearable unit in that manner (mode 2). Whenever the wearable unit does not have positive connection in either mode 1 or mode 2, to the smart phone, it must check the SMS messaging or pager system for an activation demand about once per minute.

When a WPAN technology is incorporated in the wearable unit along with paging capability, the invention can use both the manual and automatic modes to increase the probability that a broken connection (i.e. lost child) will be noticed or alarmed in nearly any conditions whether remote (where wireless coverage is poor) or congested. Once the connection is established, automatic mode should cause an alarm once the lost autistic child is out of range. The system can then be manually activated if the caregiver's smart phone and the wearable unit are still in range. This could happen in a train station for example, where even fifty feet of separation could be a major cause for concern. If the wearable unit is still in range of the WPAN and the search routine is activated, the WPAN signal can be used to pinpoint the location of the child very quickly.

The wearable unit comprises a cellular telephone unit which can be activated by an activating RF signal and which has GPS/Assisted GPS capability and a WiFi or other RF signal transceiver, along with a controller unit, power supply circuitry and battery. (WiFi is a colloquial name for IEEE 802.11.x, where "x" represents a currently used version, Wireless Local Area Network (WLAN) standards.)

The controller unit is a microcontroller, or microprocessor that uses proprietary firmware/software to control the operation of the various elements of the wearable unit.

When the wearable unit is activated, the GPS/Assisted GPS is activated by the controller unit and begins looking for satellites, optionally using stored almanac data if available.

The cellular telephone unit can use CDMA (Code Division Multiple Access) or GSM (Global System for Mobile Communications) depending on the cellular service provider used. For example, if the wearable unit uses the SMS paging feature when the wearable unit is activated, the SMS paging system will transmit a message to the smart phone to acknowledge that it has been activated.

The WiFi or other RF signal transceiver will then attempt to link to the caregiver's smart phone and the smart phone application will begin to look for the WiFi or other cellular telephone unit RF signal. Depending on the construction of the unit, the search can use WiFi only, or WiFi and another RF signal (e.g., Bluetooth) and WPAN technology for greater coverage and reliability. For example, in a shopping mall there may be many WiFi stations using all available channels, but the WPAN Bluetooth protocol uses channel hopping through 79 channels to increase ability for the signal to penetrate boundaries, and to provide a unique and secure connection.

In order to preserve battery power, the controller can turn on, or shut down any cellular telephone unit RF signal transceiver as needed. For example, once a GPS fix is acquired, the GPS module could be turned on once every few seconds, every minute, or the like, for updates. When the WPAN link is established, the transceiver can sit at very low power, and "pop up" once every few seconds to ensure that the link is maintained.

Prior to activation in the embodiment where a pager chip is used, the pager chip is in pager mode. When the chip is activated (as described below) it causes the wearable unit to emit the WiFi or other cellular telephone unit RF signal. The RF signal can be pulsed. A pulsed signal is preferred because it requires less energy. Typically, the pulsed signal would be sent every one to five seconds and the intervals and/or intensity of the pulses can be reduced over time in order to save energy. The WiFi or other cellular telephone unit RF signal may be alternately emitted at several of the channel frequencies in case there are third party WiFi or other third party RF signals in close proximity. The signal from the wearable unit can always be discerned. The WiFi or other cellular telephone unit RF signal can also contain the autistic child's password protected personal identification ("ID"). Using the ID feature, a caregiver can search for multiple children and/or multiple caregivers can assist in a search for a lost child. In a particularly preferred embodiment, the wearable unit is hermetically sealed and can be immersed in water, including sea water, without damage.

The wearable unit contains a power source such as a battery or solar cells and preferably is provided with solar cells to charge a battery. Because the wearable unit is activated infrequently and should not have to run for long periods of time, a battery supplemented with solar cells should not have to be replaced for several years. In addition to the solar charging, there may also be mechanical battery charging such as a kinetic charger that operates with motion of the wearable device, and RF charging to allow recharging the battery without the need for a connector or charging port which could leak when submersed. It is very important that the wearable unit drains as little current as possible until it is activated when a search mode is encountered.

An indelible label optionally can be placed on the wearable unit identifying the child, his condition of autism, contact information for the caregiver, allergies, blood type and the like. Password protected medical records also can be optionally incorporated in a chip in the wearable unit and accessed using either the Wifi or other RF functionality of the cellular telephone unit.

Another component of the apparatus of the invention, as noted above, is the smart phone capable of transmitting an activating RF signal (e.g., an SMS paging signal) to activate the cellular telephone unit and having a visual display screen, a compass and an accelerometer (which can function as a pedometer). Smart phones also have built in capability to measure WiFi signal strength, they have built in GPS capability and they can display local maps on the visual display screen. The smart phone is carried by a caregiver or other person who is responsible for locating the lost autistic child.

A locating application which seamlessly integrates the foregoing features of the smart phone is installed in the smart phone to enable the system and methods of the present invention. The locating application is capable of activating the pager chip or SMS paging to turn on the wearable unit and cause the cellular telephone unit in the wearable unit to emit the WiFi or other cellular telephone unit RF signal. Then the locating application employs the smart phone features to measure the WiFi signal strength and take a compass direction reading. When the caregiver moves with the smart phone, the locating application takes another compass direction reading and measures distance moved by the caregiver using the accelerometer as a pedometer. At each new location of the caregiver smart phone, the locating application also measures the WiFi or other cellular telephone unit RF signal strength. This information provides coordinates for triangulation by the locating application, thereby identifying the location, i.e. distance and direction of the lost autistic child with respect to the smart phone. The points of triangulation are the first smart phone distance to the wearable unit, the second smart phone location, distance and direction, relative to the first smart phone location, and the distance from the second smart phone location to the location of the wearable unit (i.e., the lost autistic child). This process is continuously repeated by the locating application as the caregiver moves and as the lost autistic child moves, tracking the previous location and the new location of the caregiver relative to the location of the lost child. The combination of the WiFi or other cellular telephone unit RF signal, along with the triangulation of several points in space allows the smart phone to act as a radio direction finder in respect of this feature of the invention.

When the location of the lost autistic child is identified by triangulation, the location is displayed on the visual display screen of the smart phone by an arrow pointing toward the lost child as well as a distance to the child based on the triangulation. The display may also incorporate a map if available showing both the caregiver smart phone and the wearable unit worn by the lost autistic child. The caregiver holds the smart phone horizontally and walks in the direction of the arrow toward the child until the child is found.

In the radio direction finder mode described above, the system of the invention does not need to determine the coordinates of the lost autistic child or the caregiver. Instead, the system computes the relative location of the caregiver and lost child. Thus, the caregiver's smart phone only needs to compute its own second location relative to the first location (i.e., the new location of the smart phone relative to the prior location of the smart phone) using the compass and accelerometer features. That information along with the WiFi or other cellular telephone unit RF signal distance measured from the first location and the WiFi or other cellular telephone unit RF signal distance measured from the second location is sufficient to triangulate the position of the wearable unit relative to the caregiver's smart phone. In the case where the lost autistic child may be on a different floor or level, such as in a shopping mall or large building, the smart phone application compares the distance moved by the caregiver to the change in distance to the wearable unit to determine if the lost child is at a different elevation.

The caregiver's smart phone application of the invention may also have the capability of talking directly to the wearable unit via WiFi or other RF signal for such things as retrieving personal data or medical records, relaying battery charge status, distance and direction the lost child is moving, or even GPS coordinates if the child is in an area with poor cellular reception, but acceptable GPS reception.

Referring to the drawings, FIG. 1 is a functional block diagram of the wearable unit, the operation of which is discussed above. In this diagram the components of the wearable unit include an optional pager unit 10, central processor 11, a cellular telephone module 12 having single carrier radio transmission technology (CDMA or GSM) and preferably having GPS/Assisted GPS capability and SMS paging capability, a power management/charging module 18, a RF signal transceiver such as a WiFi transceiver 14, an optional Bluetooth module 21, battery cells 19, battery charging module 20 which can include solar cells, a kinetic charger and/or a RF charger. A GPS antenna 15, a cellular antenna 16, and a RF signal transceiver antenna such as a WiFi antenna 17 or a Bluetooth antenna 22.

Figure 2:
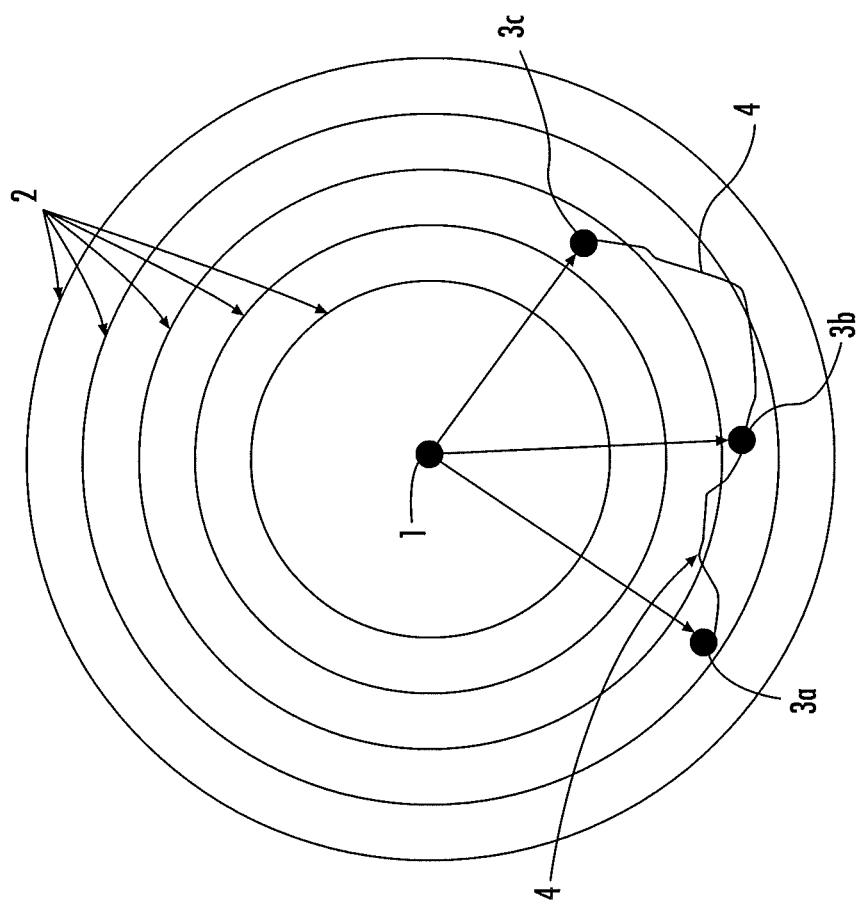
FIG. 2 is a diagram showing the basic function of the radio direction finding system and methods for the smart phone.

FIG. 2 illustrates the location of the wearable unit 1 on the lost autistic child. Concentric circles 2 represent the WiFi or other cellular telephone unit RF signal strength which diminishes as the distance is increased from the wearable unit 1. The caregiver's smart phone positions 3a, 3b and 3c represent three locations of the caregiver's smart phone 3 (see FIG. 3) as the caregiver moves from one location to another. These locations represent triangulation point positions as the smart phone receives pulsed WiFi or other cellular telephone unit RF signals from wearable unit 1. As the caregiver moves, the triangulation process is repeated each time the smart phone receives a pulsed WiFi or other cellular telephone unit RF signal from the wearable unit. A hypothetical walking path of the caregiver is illustrated by lines 4.

Figure 3:
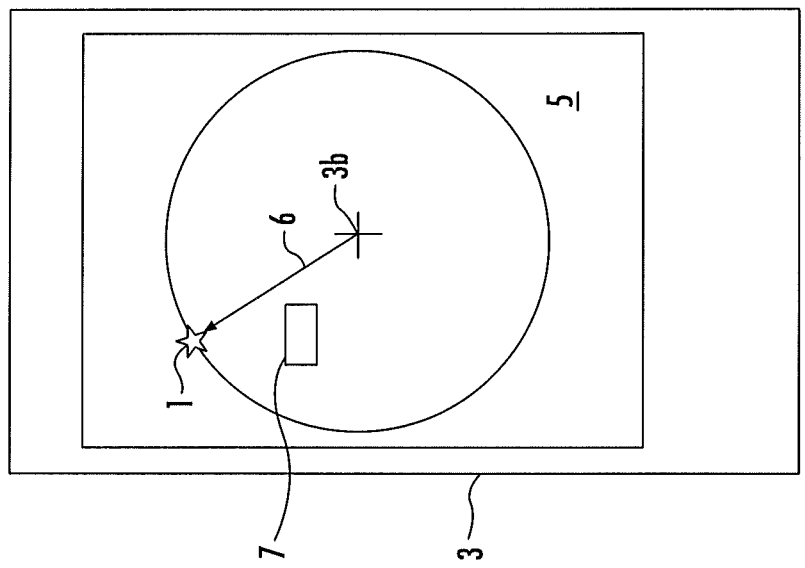
FIG. 3 is a pictorial representation of the smart phone screen showing the direction and distance to the lost person, animal or package.

In FIG. 3, the smart phone is held horizontally and the location of the wearable unit 1 of the lost autistic child is displayed by compass arrow 6 (by means of the locating application) on visual display screen 5 of smart phone 3. For example, the direction of wearable unit 1 from smart phone location 3b may be illustrated by arrow 6 and the distance in feet, yards, meters or the like is displayed within box 7 on the smart phone screen. As the caregiver moves in the direction of arrow 6, toward the lost autistic child, the new distances and directions are continuously computed until the child is found. Then the smart phone locating application is used to acknowledge the end of the search and send a signal to deactivate the cellular telephone unit in the wearable unit and return the unit to the pager mode.

The foregoing method is used in situations where the lost autistic child is relatively close to the caregiver, generally within several hundred feet. As noted above, this feature of the invention operates both indoors and outdoors. But when the lost person is further away, for example, when an Alzheimer's patient boards a bus, another feature of the invention is also used. In this case the locating application installed in the smart phone is capable of using a cell phone tower (or other third party RF signals, such as Wi/Fi, emitted from known locations) as a triangulation point (hereinafter referred to collectively and for convenience as "cell phone tower triangulation") and/or using the GPS or Assisted GPS application to determine the approximate location of the lost person. When cell phone tower triangulation is used, the triangulation points are the closest several cell phone towers (or other third party RF signal sources) to the wearable unit. Each tower has the capability of measuring the signal strength of the cell phone signal from the wearable unit and each tower is in a known geographical position. This represents the unique intersection point of 3 circles of known radius establishing the unique geographical position of the wearable unit. The cell phone tower triangulation method and Assisted GPS can be used indoors or outdoors whereas GPS is only effective outdoors. The GPS function may be assisted by nearby WiFi hot spots (or other third party RF signals) to aid in finding the location and linking to the satellites upon activation of the wearable unit by the caregiver's smart phone application. Assisted GPS may also offload the fragmented GPS signals from poor reception to the server for more complete calculation of the local position based on the almanac of satellites in that particular area. The approximate location of the lost person is then displayed by means of the locating application on a map on the visual display screen of the smart phone. As the caregiver moves close enough to the approximate location, the radio direction finder feature of the locating application seamlessly takes over so that the precise location of the lost autistic child can be computed and displayed as described above.

What is claimed is:

1. Apparatus for locating a lost or missing person, animal or package comprising:

a cellular telephone unit which can be activated by an activating RF signal and which emits a pulsed WiFi or other cellular telephone unit RF signal following activation by the activating RF signal and which is adapted to be affixed to or worn by the person, animal or package;

a smart phone capable of transmitting the activating RF signal and having a visual display screen, a compass and an accelerometer;

a locating application installed in the smart phone and being capable of measuring the strength of the WiFi or other cellular telephone unit RF signal, taking compass direction readings, taking accelerometer distance readings and computing smart phone location relative to the cellular telephone unit location by triangulation wherein the triangulation points include the relative locations of the smart phone to the cellular telephone unit;

the cellular telephone unit has GPS/Assisted GPS capability and the smart phone further comprises a GPS/Assisted GPS application and the locating application further comprises triangulation capability using as triangulation points several closest cell phone towers to the cellular telephone unit and/or locations of nearby WiFi or other third party RF signals; and a WPAN application with paging capability incorporated in the cellular telephone unit which is manually actuatable by the smart phone following activation by the activating RF signal;

wherein a RF wireless connection is maintained between the cellular telephone unit and the smart phone as long as said cellular telephone unit and smart phone are within a specified range; when the range is exceeded the connection is broken whereupon the activating RF signal is transmitted by the smart phone and the RF signal is pulsed to conserve energy.

2. The apparatus of claim 1 wherein the cellular telephone unit has SMS paging capability, the smart phone has SMS paging capability and the activating RF signal is an SMS paging signal.

3. A system for locating a lost or missing person, animal or package comprising:

a cellular telephone unit which can be activated by an activating RF signal and which emits a pulsed WiFi or other cellular telephone unit RF signal following activation by the activating RF signal and which is adapted to be affixed to or worn by the person, animal or package;

a smart phone capable of transmitting the activating RF signal and having a visual display screen, a compass and an accelerometer;

a locating application installed in the smart phone and being capable of measuring the strength of the WiFi or other cellular telephone unit RF signal, taking compass direction readings, taking accelerometer distance readings and computing smart phone location relative to the cellular telephone unit location by triangulation wherein the triangulation points include relative locations of the smart phone to the cellular telephone unit;

the cellular telephone unit has GPS/Assisted GPS capability and the smart phone further comprises a GPS/Assisted GPS application and the locating application further comprises triangulation capability using as triangulation points several closest cell phone towers to the cellular telephone unit and/or locations of nearby WiFi or other third party RF signals; and a WPAN application with paging capability incorporated in the cellular telephone unit which is manually actuatable by the smart phone following activation by the activating RF signal;

wherein a RF wireless connection is maintained between the cellular telephone unit and the smart phone as long as said cellular telephone unit and smart phone are within a specified range; when the range is exceeded the connection is broken whereupon the activating RF signal is transmitted by the smart phone, the RF signal is pulsed to conserve energy and upon activation of the cellular telephone unit a first WiFi or other cellular telephone unit RF signal strength is computed with respect to a first smart phone location, and upon movement of the smart phone a second smart phone location is computed with respect to the first smart phone location by means of the compass and accelerometer readings, then a second WiFi or other cellular telephone unit RF signal strength is computed and the location of the cellular telephone unit relative to the second smart phone location is computed by triangulation and displayed on the visual display screen and/or wherein, using the GPS/Assisted GPS capability upon activation of the cellular telephone unit, the approximate location of the lost or missing person, animal or package is determined by the GPS/Assisted GPS application and/or by cell phone tower triangulation.

4. The system of claim 3 wherein the cellular telephone unit has SMS paging capability, the smart phone has SMS paging capability and the activating RF signal is an SMS paging signal.

* * * * *